United States Patent
Wei

(10) Patent No.: US 7,023,424 B2
(45) Date of Patent: Apr. 4, 2006

(54) CORD STORAGE DEVICE FOR MOUSE

(76) Inventor: Jose Wei, No. 17-2, Pai Ling 1st Rd., Hsin Tien City, Taipei Hsien (TW)

( * ) Notice: Subject to any disclaimer, the term of this patent is extended or adjusted under 35 U.S.C. 154(b) by 395 days.

(21) Appl. No.: 10/436,152

(22) Filed: May 13, 2003

(65) Prior Publication Data

US 2004/0178991 A1    Sep. 16, 2004

(30) Foreign Application Priority Data

Mar. 10, 2003  (TW)  ................................ 92203617 U

(51) Int. Cl.
*G09G 5/08* (2006.01)
(52) U.S. Cl. ...................................... 345/163; 345/157
(58) Field of Classification Search ................ 345/156, 345/157, 159, 163, 164, 169, 160, 168; 361/683, 361/684, 685, 686; 341/22
See application file for complete search history.

(56) References Cited

U.S. PATENT DOCUMENTS

| | | | |
|---|---|---|---|
| 6,088,021 A * | 7/2000 | Yong | 345/163 |
| 6,392,635 B1 * | 5/2002 | Snyder | 345/163 |
| 6,600,479 B1 * | 7/2003 | Smith et al. | 345/163 |
| 2002/0167492 A1 * | 11/2002 | Lou et al. | 345/163 |
| 2003/0071783 A1 * | 4/2003 | Chen | 345/156 |
| 2003/0128189 A1 * | 7/2003 | Chung | 345/163 |
| 2003/0184521 A1 * | 10/2003 | Sugita | 345/163 |

* cited by examiner

*Primary Examiner*—Vijay Shankar
*Assistant Examiner*—Nitin Patel
(74) *Attorney, Agent, or Firm*—Dennison, Schultz, Dougherty & MacDonald

(57) ABSTRACT

A cord storage device for mouse includes characteristics of an cord extended from a mouse body thereof and winded and stored in large and small storage grooves formed at large and small turning wheels thereof. Using the large and small turning wheels that rotate coaxially, inner and outer cords attached in the large and small turning wheels are released or winded at different lengths. Using the structure, the defined inner and outer cords are stored into or released from an interior of a base of a mouse, and the mouse body is combined with the base into one body for easy carrying.

7 Claims, 11 Drawing Sheets

CORD STORAGE DEVICE FOR MOUSE

BACKGROUND OF THE INVENTION (a) Field of the Invention

The invention relates to a cord storage device for mouse, and more particularly, to a cord storage device capable of collecting and releasing a cord of a mouse as well as forming an integral with the mouse body thereof.

(b) Description of the Prior Art

Referring to a prototypic cord storage device for mouse disclosed in the Taiwan Patent Publication No. 446903, Mouse Capable of Storing Signal Cord, the prior invention utilizes two disk-like guiding members manually operated and winded for releasing or collecting a signal cord 40 from or into an accommodating room at an interior of a mouse. However, the signal cord 40 is likely to be tangled and thus stored in disorder when being collected into the accommodating room 25. Also, the invention lacks designs of elastic elements capable of automatically collecting the cord, and hence winding of the guiding members 17 and 23 are manually operated; the invention as a whole is rather inconvenient.

Referring to another invention disclosed in the Taiwan Patent Publication No. 519264, Mouse Having Cord Storage Chamber, wherein upper and lower housings 12 and 14 are connected using a center axis 133 that further forms a cord storage chamber 134 at a space at an exterior thereof, and a signal cord is winded and stored around the center axis 133. When the signal cord is extracted using a human hand, the mouse body is rotates as well; and when the cord is collected into the cord storage chamber using a human hand, it is also necessary to manually rotate the mouse body in a reverse direction. The collecting and releasing of such mouse are entire completed using manual operations, and are thus quite inappropriate.

Referring to another invention disclosed in the Taiwan Patent Publication No. 444174, Mouse Having Cable Winding Device, this prior invention utilizes an elastic element 25 for driving a single cord storage wheel 23 flexibly connected on an axis thereof such that when a signal cord 40 is released out of or collected into the cord storage wheel 23, in order to have the signal cord 40 conduct to internal circuits of the mouse, a conductive body 23b is provided at the cord storage wheel 23, so that the conductive body 23b is rubbed against an immovable cover piece 21 having a printed conductive layer at an internal surface thereof when the conductive body 23b is rotated simultaneously with the cord storage wheel 23. In the long term, the conductive body 23b is abraded and deformed or the conductive layer at the internal surface of the cover piece 21 becomes worn for that the conductive body 23b is constantly rubbed against the conductive layer at the inner surface of the cover piece 21, and thus finally leading to poor contact and conduction.

Referring to the inventor's prior invention disclosed in the U.S. Pat. No. 6,434,249 B1, Earphone Wire Winding Box with Coaxial and Dual Wheels, the invention overcomes the problem of poor contact between conductive terminal of circuits and circuit structure of an electric appliance as described in the aforesaid invention. Two turning wheels, one large and one small, are provided in the inventor's prior invention, wherein a signal wire is stored on wheel breadths of the large and small turning wheels 10 and 20, through which one conductive terminal of the signal wire is kept fixed, so that sliding movements are not required for electrically connecting a conductive element thereof with circuit elements at an interior of the electric appliance.

The inventor's prior invention is indeed quite useful; however, to further implement the invention in various other applications, the technique using coaxial and dual wheels shall be put to use in mouse structures.

SUMMARY OF THE INVENTION

Therefore, the primary object of the invention is to provide a cord storage device for mouse, wherein a plurality of wheels having different or equal diameters are utilized for storing a mouse cord at wheel breadths thereof, as well as being capable of winding and releasing the mouse cord.

Another object of the invention is to provide a cord storage device for mouse, wherein large and small turning wheels thereof and an axis portion thereof are disposed at an interior of an independent base thereof, so as to wind or release the mouse cord into or out of the base. In addition, a surface of the base also provides placement of the mouse in order to be readily portable.

The other object of the invention is to provide a cord storage device for mouse, wherein two turning wheels having different diameters, and an axis portion thereof are disposed in an accommodating room of the mouse body, so as to collected or release the cord into or out of the mouse body.

DETAILED DESCRIPTION OF THE PREFERRED EMBODIMENTS

To better understand the characteristics and functions of the invention, descriptions of preferred embodiments shall be given with accompanying drawings below.

Figure 1:
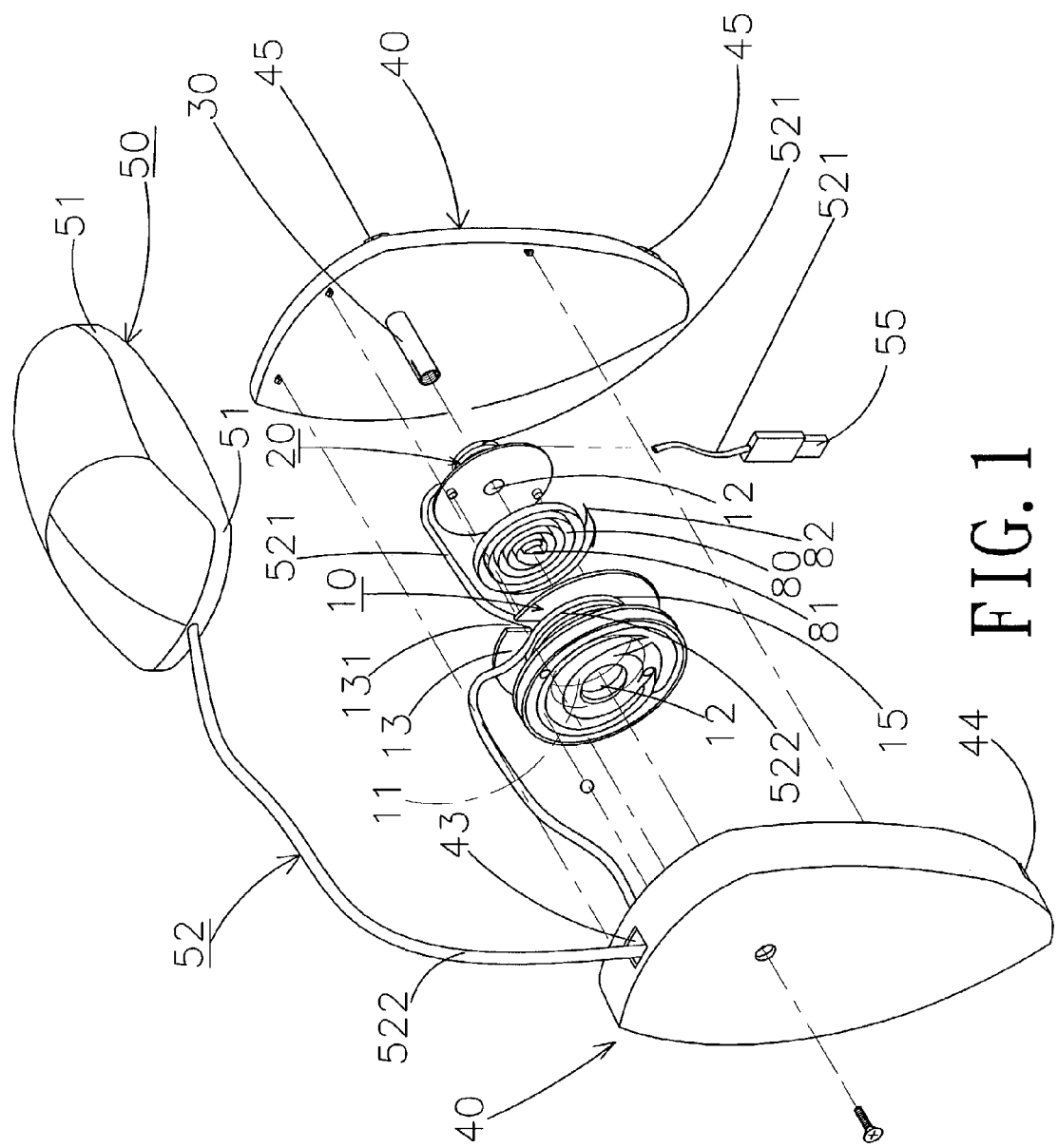
FIG. 1 shows an exploded elevational view illustrating an embodiment according to the invention.
Figure 3:
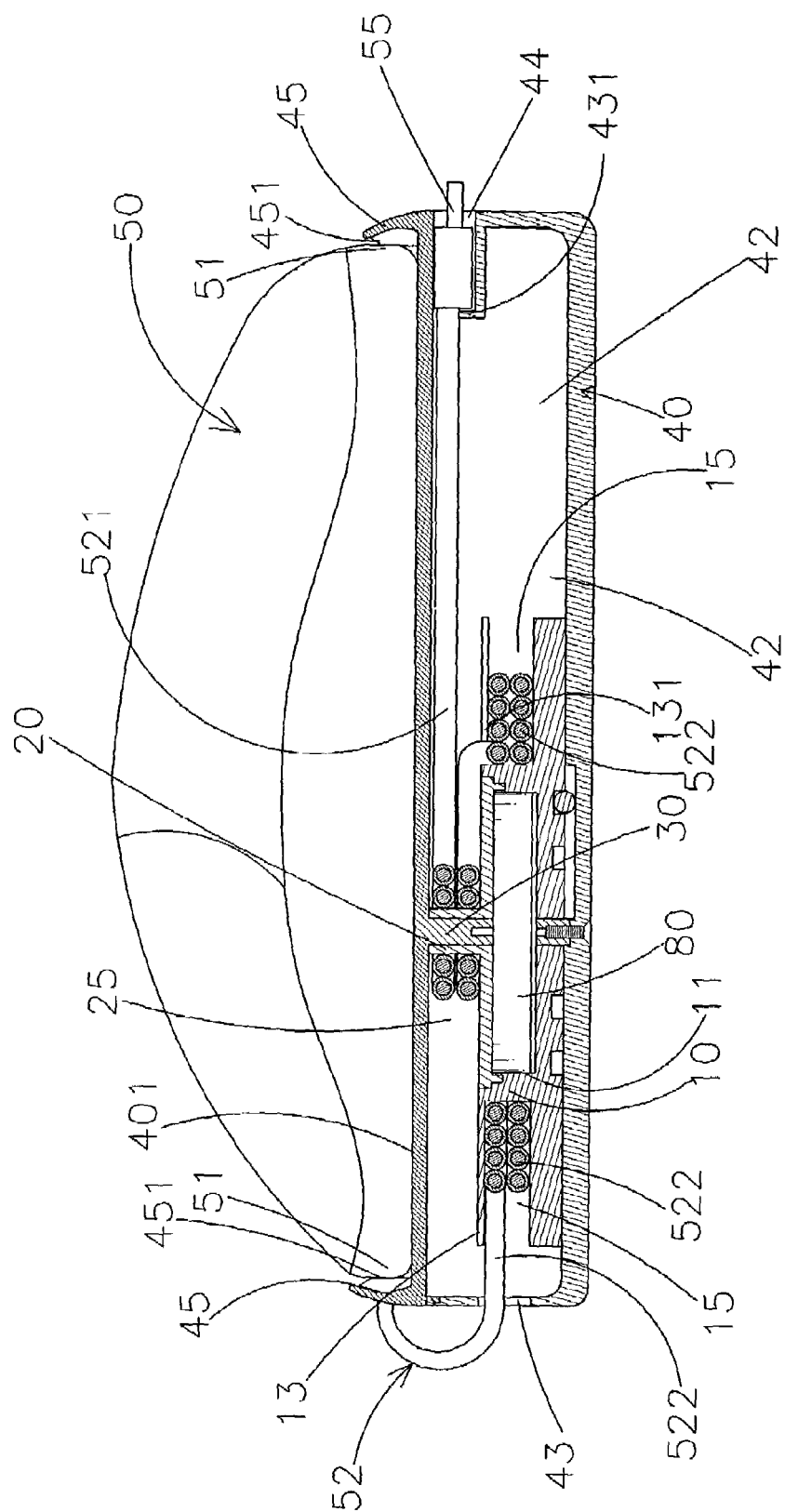
FIG. 3 shows a sectional view of the base according to the invention.

Referring to FIGS. 1 and 3, the structural characteristics of the invention comprise:

a cord 52 of a certain length extended from a mouse body 50, and an outer end of the cord 52 being connected to a plug (socket) 55;

a large turning wheel 10 having a larger diameter and a small turning wheel 20 having a smaller diameter, and center openings 12 of the two turning wheels being flexibly connected to an axis portion 30; large and small storage grooves 15 and 25 formed on breadths of the large and small turning wheels 10 and 20, respectively, so as to have the cord 52 winded and stored into the large and small storage grooves 15 and 25; wherein the cord 52 stored in the large and small turning wheels 10 and 20 are distinguished as an inner cord 521 and an outer cord 522, respectively;

a spring 80 having an inner end 81 thereof connected to the axis portion 30 and an outer 82 thereof connected to wall surfaces of an inner groove 11 provided at a side of the large turning wheel 10; and a base 40 disposed with an accommodating room 42 at an interior thereof and guiding orifices 43 and 44 disposed at front and rear ends thereof, respectively; wherein the large and small turning wheels 10 and 20, and the axis portion 30 are disposed in the accommodating room 42, the axis portion 30 and the accommodating room 42 of the base 40 are a formed integral for forming a fixed axis, the inner cord 521 is guided to the exterior via the guiding orifice 44, and the outer cord 522 is guided to the exterior via the other guiding orifice 43.

According to the aforesaid primary characteristics, wherein a ring-shaped protruding piece 13 having an aperture 131 is provided between the large and small turning wheels 10 and 20. The inner cord 521 is passed through the aperture 131 for forming the outer cord 522 that is further winded in the large storage groove 15, and a detent portion of the inner and outer cords 521 and 522 is formed at the aperture 131.

According to the aforesaid primary characteristics, wherein a bottom of the guiding orifice 44 provided at one side of the base 40 is disposed with a stop portion 431.

Figure 6A:
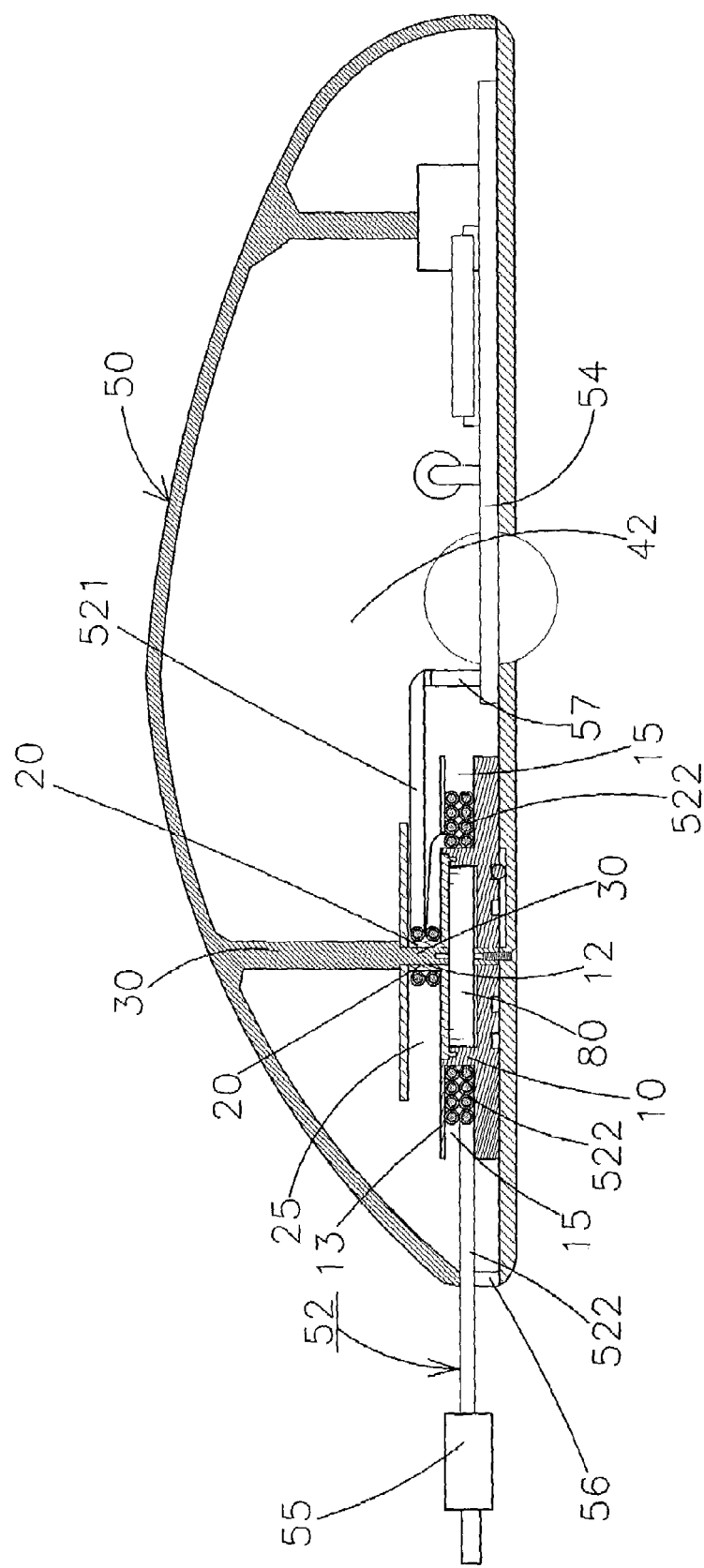
FIG. 6A shows a sectional view illustrating the large and small turning wheels being disposed at an interior of the mouse body.
Figure 6B:
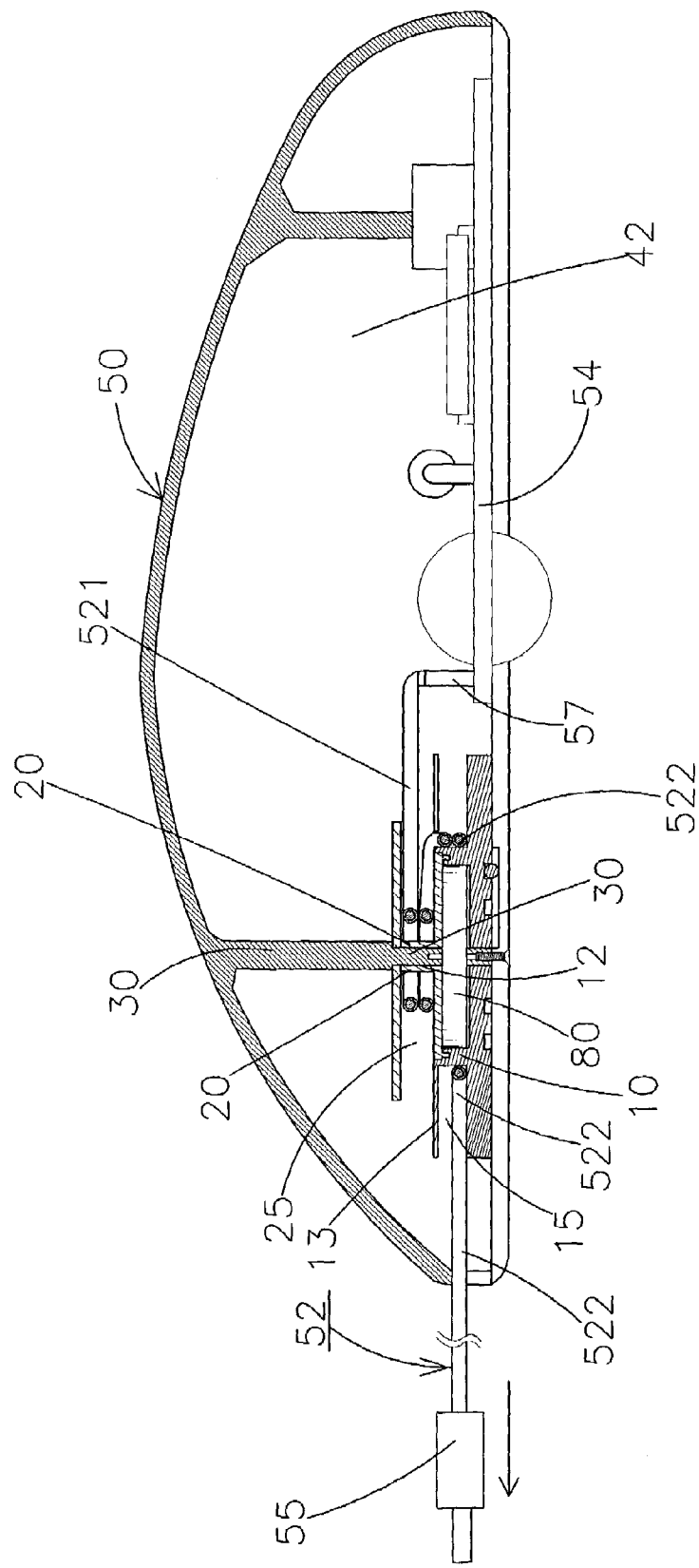
FIG. 6B shows a sectional view illustrating the inner and outer cords being pulled out according to FIG. 6A.

Referring to FIGS. 6A and 6B, a cord storage device for mouse further comprises the characteristics of:

a mouse body 50 having a guiding orifice 56 at an rear end thereof and an accommodating room 42 at an interior thereof;

a large turning wheel 10 having a larger diameter and a small turning wheel 20 having a smaller diameter, and center openings 12 of the two turning wheels being flexibly connected to a single axis portion 30 that is further fixed and connected to wall surfaces of the accommodating room 42 of the mouse body 50;

large and small storage grooves 15 and 25 formed on breadths of the large and small turning wheels 10 and 20, respectively, so as to have the cord 52 winded and stored into the large and small storage grooves 15 and 25; wherein the cord 52 stored in the large and small turning wheels 10 and 20 are distinguished as an inner cord 521 and an outer cord 522, respectively; and a spring 80 having an inner end 81 thereof (not shown in the diagram) connected to the axis portion 30 and an outer end 82 thereof (not shown in the diagram) connected to a wall surface of an inner groove 11 provided at one side of the large turning wheel 10 so that the outer cord 522 is guided to the exterior via the guiding orifice 56; wherein a conductive terminal 57 of the inner cord 521 is connected to a circuit board 54 and an outer terminal of the outer cord 522 is connected to a plug 55.

Figure 5:
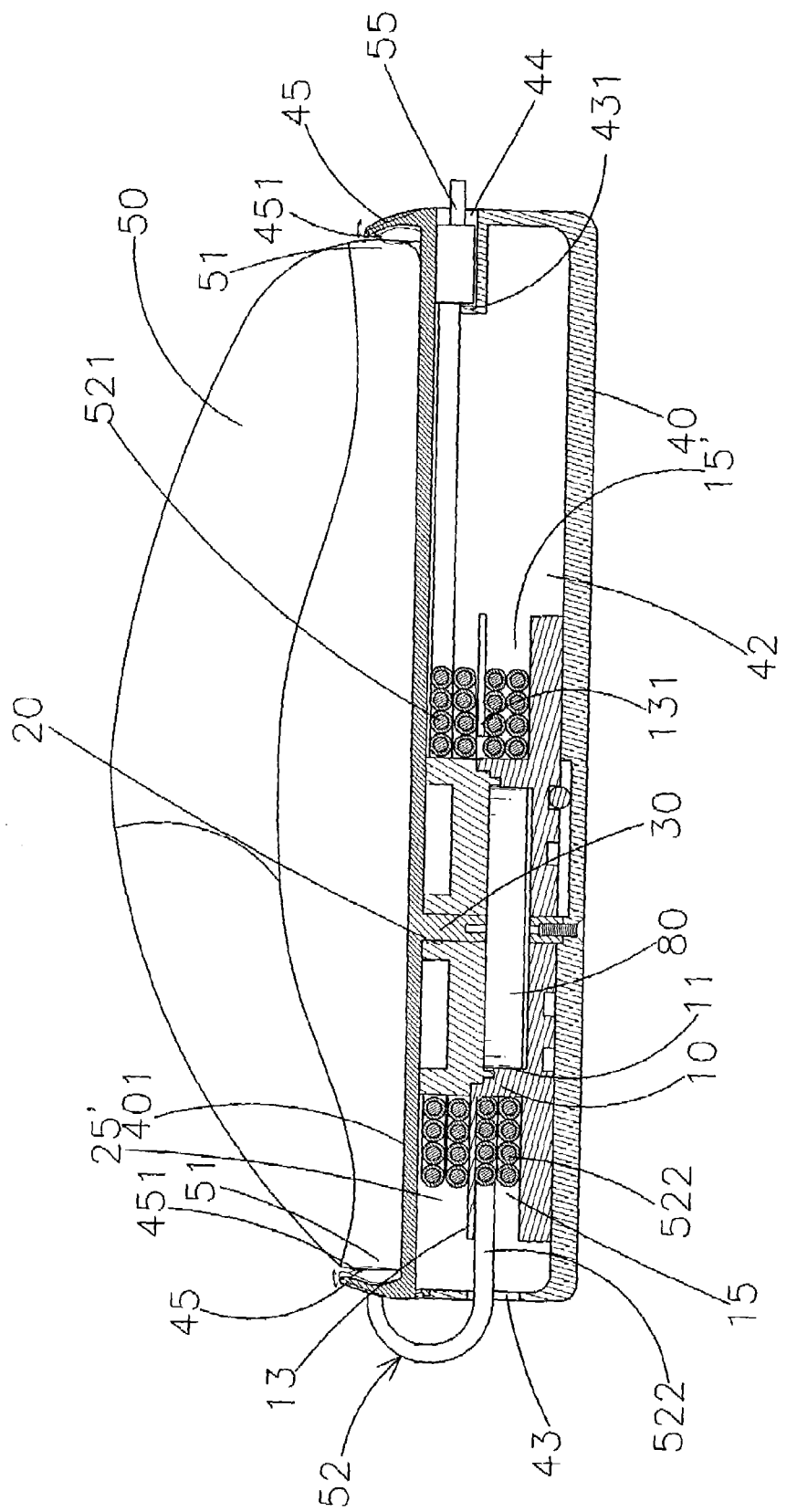
FIG. 5 shows a sectional view illustration the large and small turning wheels having same diameters according to the invention.

According to the aforesaid primary characteristics, wherein the large and small turning wheels 10 and 20 may have same diameters so as to form storage grooves 15' and 25' having equal diameters as shown in FIG. 5.

Figure 2A:
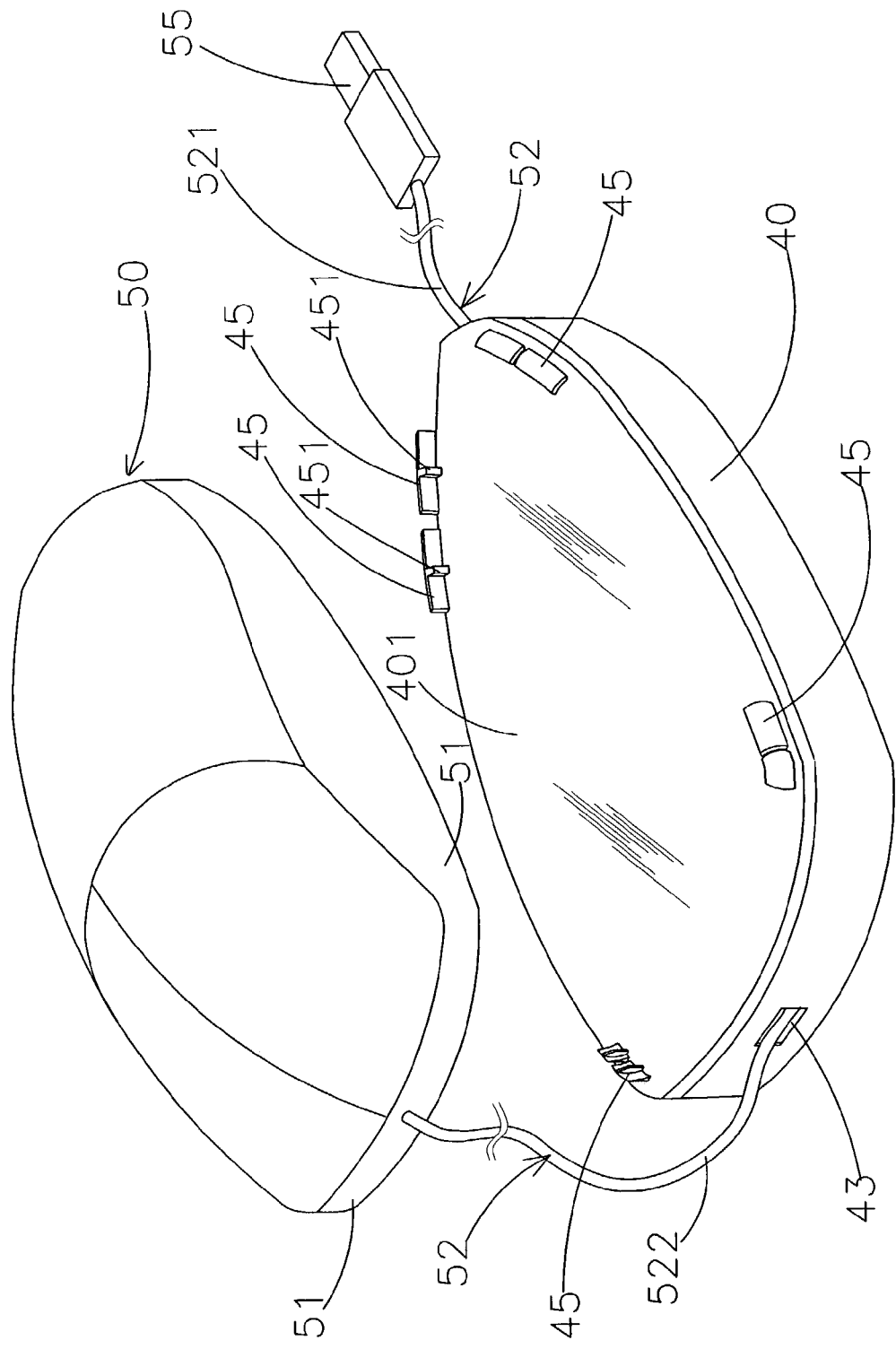
FIG. 2A shows an exploded elevational view of the mouse body and the base being connected according to the invention.
Figure 2B:
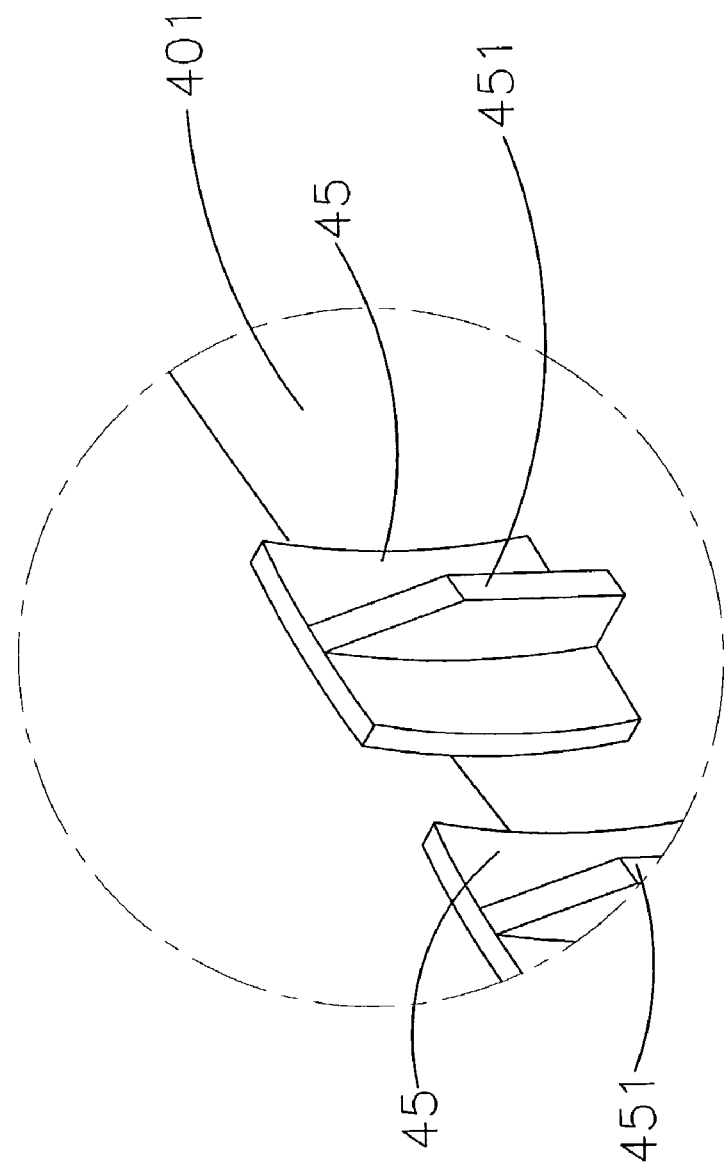
FIG. 2B shows an enlarged elevational view illustrating the arched edges of the base according to the invention.
Figure 2C:
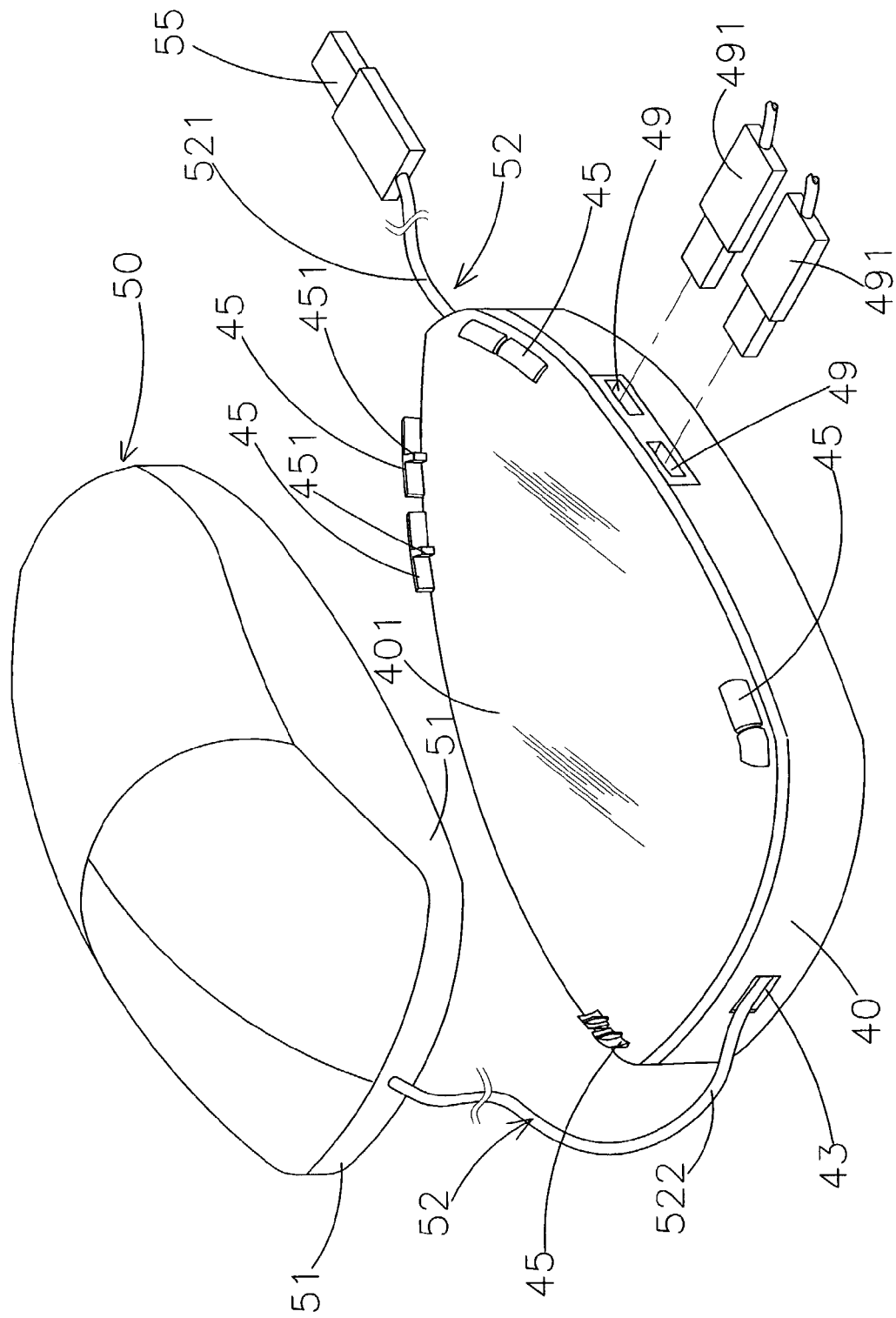
FIG. 2C shows an elevational view illustrating a USB port provided in the base according to the invention.

According to the aforesaid primary characteristics, wherein a side wall of the base 40 is disposed with a USB connector port 49 as shown in FIG. 2C.

According to the aforesaid primary and secondary characteristics, excellences of the invention shall be described in the following examples.

EXAMPLES

Figure 4:
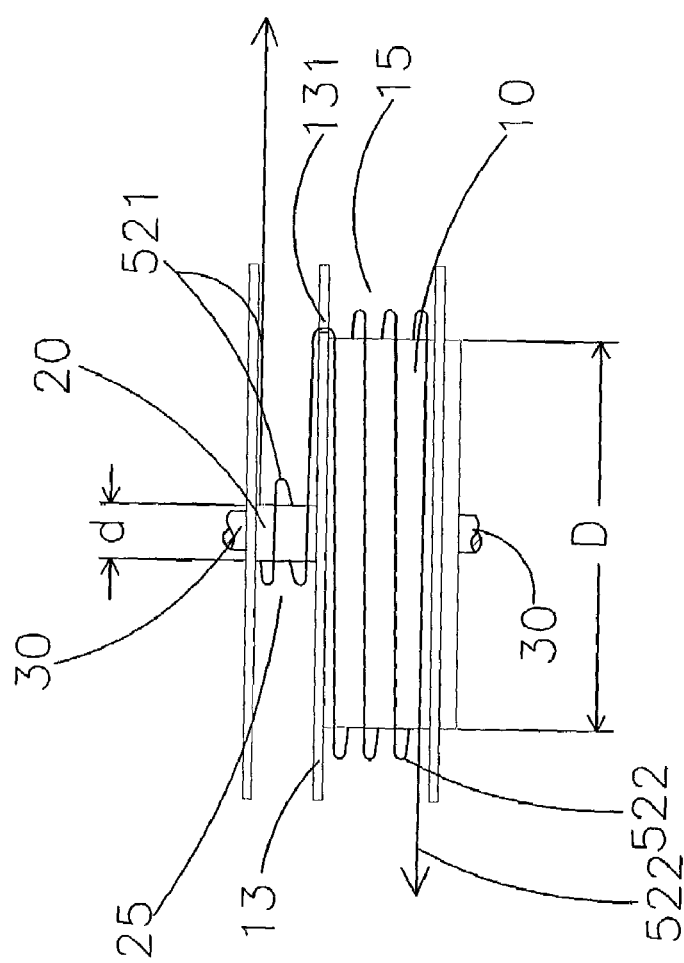
FIG. 4 shows a side schematic view illustrating simultaneous rotations of the large and small turning wheels according to the invention.
Figure 7:
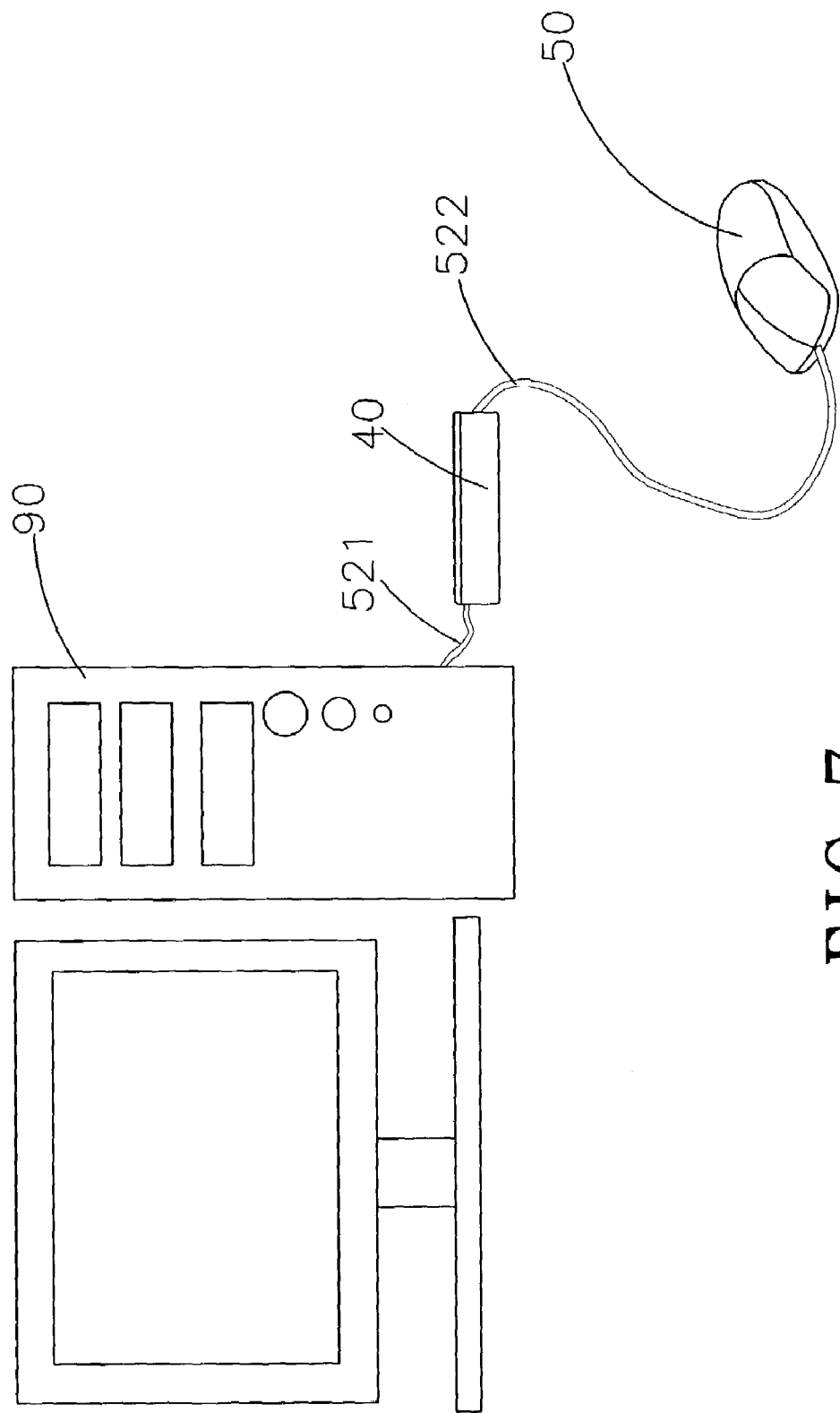
FIG. 7 shows a planar schematic view illustrating the invention being implemented in an electric appliance.
Figure 8:
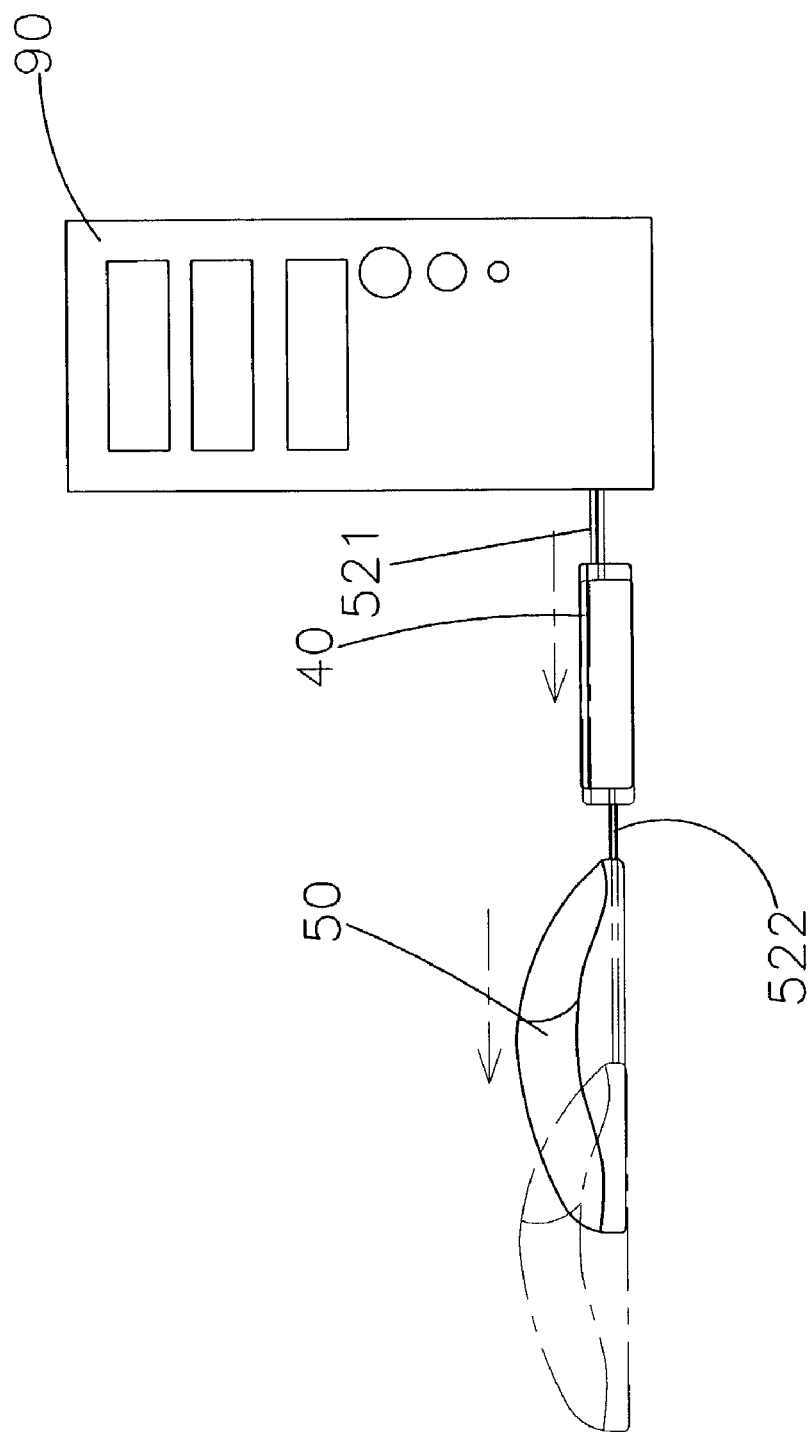
FIG. 8 shows a planar schematic view illustrating the invention in action being implemented in an electric appliance.

1. Referring to FIGS. 3 and 4, the large and small turning wheels are both flexibly connected to the same axis portion 30, and hence the small turning wheel 20 also rotates one revolution when the large turning wheel 10 turns one revolution. For one revolution made by the large turning wheel 10, the outer cord 522 being released from (or winded into) the large storage wheel 15 equals to $\pi \times D$, where D is the diameter of the large turning wheel 10; similarly, for one revolution made by the small turning wheel 20, the inner cord 521 released from (or winded into) the small storage groove 25 equals to $\pi \times d$, where d is the diameter of the small turning wheel 20. As a result, when the large and small turning wheels 10 and 20 rotate using a same axis, the ratio of lengths of cord released (or winded) equals to the ratio of diameters of the large and small turning wheels 10 and 20; that is, D: d. In a preferred embodiment of the invention, the ratio of diameters of the large and small turning wheels 10 and 20 is 6:1. Suppose the outer cord 522 is released when the mouse body 50 is pulled out by a user, the inner cord 521 having an attached plug 55 is released along as well. Provided that the outer cord 522 being released is 50 cm for the usage of the mouse body 50, the inner cord 521 released from the small storage groove 25 via the guiding orifice 44 is 8.3 cm, so that the plug 55 connected to the outer end of the inner cord 521 may be plugged to a power connector port of an electric appliance 90 as shown in FIGS. 7 and 8. Therefore, when the mouse body 50 is pulled out and displaced, excessive displacement between the plug 55 and the base 40 is not incurred. During cord winding, the spring 80 imposes a contraction effect on the large and small turning wheels 10 and 20, and thus the inner and outer cords 521 and 522 are winded back into the large and small storage grooves 15 and 25. Wherein, a rear end of the plug 55 is stopped at the stop portion 431 that provides a positioning effect when the plug 55 is being restored back into the base 40 as shown in FIGS. 3 and 5.

2. Referring to FIGS. 2A and 2B, inner sides of arched edges 45 are provided with slanting flanges 451 for the mouse body 50 to fasten to a surface 401 in a downward direction. A periphery 51 of the mouse body 50 is butted against the flanges 451 such that the arched edges 45 are deformed outwardly with elasticity, thereby effectively mounting and positioning the mouse body 50 onto the surface 401 and combining the mouse body 50 with the base 40 into one body for easy storage and carrying. To use the structure, only the mouse body 50 needs to be pulled out from the base 40 in an upward direction, then forces imposed by the flanges 451 are disappeared and the arched edges 45 are elastically repositioned.

3. Referring to FIG. 6 showing another embodiment according to the invention, the large and small turning wheels 10 and 20 are disposed in the accommodating room 42 located at the interior of the mouse body 50, and thus the independent base 40 may be eliminated in this embodiment. When the outer cord 522 is released, the large and small turning wheels 10 and 20 rotate coaxially regarding the axis portion 30 as a rotation axis thereof. At this point, the ratio of the diameters of the large and small turning wheels 10 and 20 may be increased (10:1, for example); the larger the ratio is, the shorter the length of the inner cord 521 released becomes, and therefore the length of the inner cord 521 is extremely short. Also, the conductive terminal 57 of the inner cord 521 may be a fixed connector port, and the inner cord 521 is in a lax state in the small storage groove 25 during cord releasing without making a mess in the accommodating room 42 (as shown in FIG. 6B).

4. Referring to FIG. 5, the large and small turning wheels 10 and 20 may also be designed as having same diameters (1:1) for adapting to various operating environments or special requirements, and hence the lengths of the inner and outer cords 521 and 522 are equal to each other when being released. FIG. 7 shows a planar view illustrating the inner cord 42 in the base 40 being connected to a power socket of the electric appliance 90. Referring to FIG. 8, when the mouse body 50 according to the invention is pulled out, the length of the outer cord 522 drawn from the base 40 is comparatively large and the inner cord 521 drawn is extremely small. Referring to FIG. 2C, the invention may also provide at least one USB connector port 49 at one side of the base 40 for plugging a USB plug 491 when necessary.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A cord storage device for mouse comprising:
   a cord of a certain length extended from a mouse body, and an outer end of the cord being connected to a plug;
   a large turning wheel having a larger diameter and a small turning wheel having a smaller diameter, and center openings of the two turning wheels being flexibly connected to a single axis portion; and large and small storage grooves formed on breadths of the large and small turning wheels, thereby enabling an inner cord winded and stored into the large storage groove, and an outer cord winded and stored into the small storage groove;
   a spring having an inner end thereof connected to the axis portion and an outer thereof connected to wall surfaces of an inner groove provided at one side of the large turning wheel; and
   a base disposed with an accommodating room at an interior thereof and a guiding orifice disposed at front and rear ends thereof; wherein the large and small turning wheels, and the axis portion are disposed in the accommodating room, the axis portion and the accommodating room of the base are a formed integral for forming a fixed axis, the inner cord is guided to the exterior via one of the guiding orifices, and the outer cord is guided to the exterior via the other guiding orifice.

2. The cord storage device for mouse in accordance with claim 1, wherein arched edges are provided at sides of the surface of the base, thereby mounting and positioning the mouse body onto a surface of the base by butting an outer periphery of the mouse body against inner walls of the arched edges.

3. The cord storage device for mouse in accordance with claim 1, wherein a ring-shaped protruding piece having an aperture is provided between the large and small turning wheels, the inner cord is passed through the aperture whereby forming the outer cord that is further winded in the large storage groove, whereas a detent portion of the inner and outer cords is formed at the aperture.

4. The cord storage device for mouse in accordance with claim 1, wherein a bottom of one of guiding orifice provided at one side of the base is disposed with a stop portion.

5. A cord storage device for mouse further comprising the characteristics of:
   a mouse body having a guiding orifice at a rear end thereof and an accommodating room at an interior thereof;
   a large turning wheel having a larger diameter and a small turning wheel having a smaller diameter, and center openings of the two turning wheels being flexibly connected to a single axis portion that is further fixed and connected to wall surfaces of the accommodating room of the mouse body;
   large and small storage grooves formed on breadths of the large and small turning wheels, thereby enabling an inner cord and an outer cord winded and stored into the large and small storage grooves; wherein the inner cord is stored in the large turning wheel, whereas the outer cord is stored in the small turning wheel;
   a spring having an inner end thereof connected to the axis portion and an outer end thereof connected to a wall surface of an inner groove provided at one side of the large turning wheel so that the outer cord is guided to the exterior via the guiding orifice.

6. The cord storage device for mouse in accordance with claim 1, wherein the large and small turning wheels may have same diameters so as to form storage grooves having equal diameters.

7. The cord storage device for mouse in accordance with claim 1, wherein a side wall of the base is disposed with a Universal Serial Bus (USB) connector port.

* * * * *